United States Patent [19]

Frederick

[11] 4,180,158
[45] Dec. 25, 1979

[54] CONVEYOR ASSEMBLY FOR USE IN CHECK OUT STANDS

[76] Inventor: Roderick J. Frederick, 1205 6th Ave. South, Seattle, Wash. 98134

[21] Appl. No.: 901,150

[22] Filed: Apr. 28, 1978

[51] Int. Cl.² .......................... B65G 15/02; A47F 9/02
[52] U.S. Cl. ..................................... 198/831; 186/1 A
[58] Field of Search ............... 186/1 A, 1 R; 198/831, 198/835, 839, 842; 193/35 MD

[56] References Cited

U.S. PATENT DOCUMENTS

| | | | |
|---|---|---|---|
| 1,817,373 | 8/1931 | Hopkins | 198/831 |
| 2,413,339 | 12/1946 | Stadelman | 198/831 |
| 2,599,909 | 6/1952 | George | 186/1 A |
| 3,016,127 | 1/1962 | Cooper | 198/839 |
| 3,838,767 | 10/1974 | Taylor | 198/831 |
| 3,960,420 | 6/1976 | Speraw et al. | 186/1 A |

FOREIGN PATENT DOCUMENTS

| | | | |
|---|---|---|---|
| 1139618 | 11/1962 | Fed. Rep. of Germany | 186/1 A |
| 2627014 | 12/1977 | Fed. Rep. of Germany | 193/35 MD |

Primary Examiner—Albert J. Makay
Assistant Examiner—Edmond G. Rishell, Jr.
Attorney, Agent, or Firm—Roy E. Mattern, Jr.

[57] ABSTRACT

A product conveying assembly for installation, for example, in a market check out stand receives products selected for purchase and brought by a customer in a buggy or cart and orderly end delivers them to a checker in the immediate location of a product code scanner, a key-in cost entry register, a scale, and/or bagging location. The customer places the products being purchased on a circular rotation product receiving and delivering belt, which has its central portions rotatably supported for rotation about a vertical support, rotatably mountable on a market check out stand. Over half but not all of this circular rotation product receiving and delivering belt is slidably guided on a support mountable on a check out stand. Further, this belt, beyond the slidable guiding support, is folded under as multi-directional rotational guides, such as omni wheels, are mounted on a shaft in turn mountable on a check out stand, to guide at least one side of this folding circular rotation product receiving and delivering belt, beyond the end delivery of a customer's products to a checker. Movement of this belt around the vertical support and over the omni wheels, occurs as a driving wheel assembly, mountable on the check out stand, rotatably bears against and rotates tangentially against the respective top and bottom peripheral surfaces of the folded under portion of the circular rotation product receiving and delivering belt.

14 Claims, 11 Drawing Figures

CONVEYOR ASSEMBLY FOR USE IN CHECK OUT STANDS

BACKGROUND OF THE INVENTION

In stores where customers roam among the aisles selecting products for purchase, they often bring their selected products to a check out stand for compilation of the total charges, taxes, payment, and bagging of the products. There have been and are many check out stands designed to accomplish these checking out functions in the most efficient way for all concerned. When the selected products were and are to be placed on a conveyor by the purchaser, in reference to the past check out stands, a full circling belt or an elongated linear belt has been used. However, neither are known to have been arranged for compact utilization of less floor space, nor generally have either been arranged for end delivery to a checker, so the checker may remain essentially in one facing position and location to receive the products for their scanning, for weighing if necessary, and/or for posting of their cost entries in a register, and thereafter for immediately and conveniently bagging the customer's purchased products.

SUMMARY OF THE INVENTION

A more compact, versatile, efficient, product conveying assembly is available for installation, for example, in a market check out stand, which in turn is then more versatile, efficient, and compact, often occupying less floor space than other market check out stands. The customers, after roaming the aisles of the market, bring their purchased products, often in a buggy or cart, and place them on a circular rotation product receiving and delivering belt of a product conveying assembly, which is installed in a market check out stand. The central portions of this belt are rotatably supported on and about a vertical support rotatably mounted on a market check out stand. Over half but not all of this belt is slidably guided on a support, which also is a component of this product conveying assembly and also it is mounted on the market check out stand. Beyond this slidable guiding support, the circular rotation product receiving and delivering belt is folded under by using multi-directional rotational guide or cam components, such as by using omni wheels. They are mounted on a shaft, in turn mounted on a check out stand, to guide at least one side of this then folding under circular belt.

Where this belt so folds under, the purchased products are then end delivered to a checker, where a product code scanner is located to directly receive the products being guided by the checker from the belt. When necessary uncoded products are weighed and/or examined quickly to determine their prices and then the respective prices are entered via the key-in entry facilities generally located adjacent one side of the scanner, with the scale located on the opposite side of the scanner. Also the bagging of the cumulative purchased products occurs directly in front of the checker and just beyond the scanner.

Moreover, from this unique position, the checker controls the rotative movement of the circular rotation product receiving and delivery belt by starting and stopping the drive mechanism. This drive mechanism includes an electric motor driving one wheel located above the peripheral portions of the folded under belt and bearing against it, while another like wheel, without power, but with a spring force also bears against the belt from below the peripheral portions of the folded under belt.

As so arranged and operated with the customer's initial help, the checker effectively and efficiently performs his or her checking out functions and has the customer on her or his way very promptly. When necessary, in extremely rushed conditions, the checker may perform all functions except bagging and direct the scanned and/or tabulated purchased products to a holding area for bagging by an assistant, or the two of them may be bagging in the same time period. A drop leaf shelf is utilized during this dual or other bagging procedural time over which the scanned and/or tabulated products are more conveniently moved to the holding area by the checker to be bagged by an assistant during those extremely rushed periods.

DESCRIPTION OF THE DRAWINGS

A preferred embodiment of the invention is illustrated in the drawings, wherein:

FIG. 11, is a partial sectional view also looking from the left, buggy, or cart side, of the check out stand, of

DESCRIPTION OF THE PREFERRED EMBODIMENT

Figure 1:
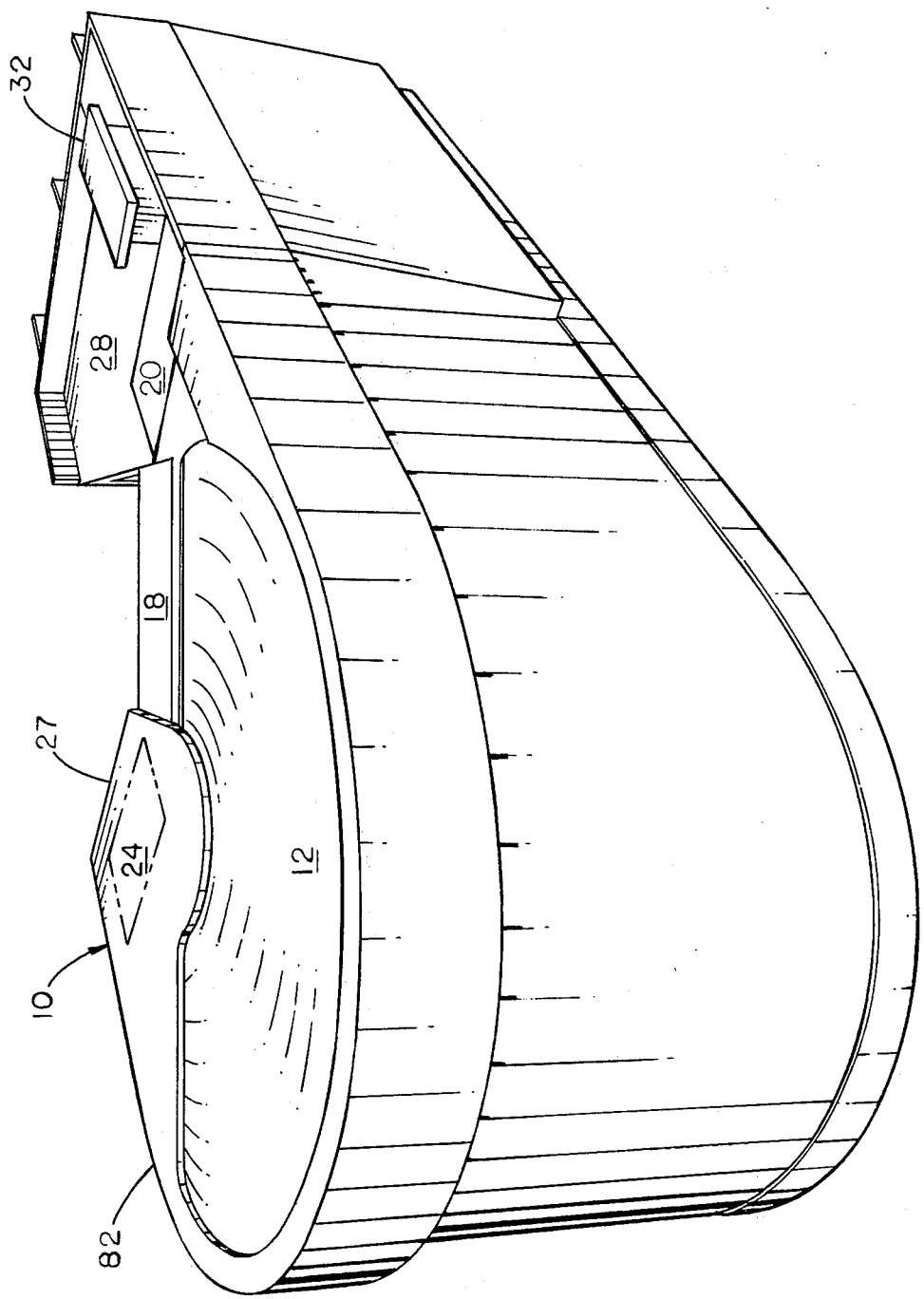
FIG. 1 is a front perspective view of market check out stand with a circular rotation product receiving and delivering belt, folded under by using omni wheels, to provide an end delivery of the customer selected products to a product code scanner being used by a checker.
Figure 2:
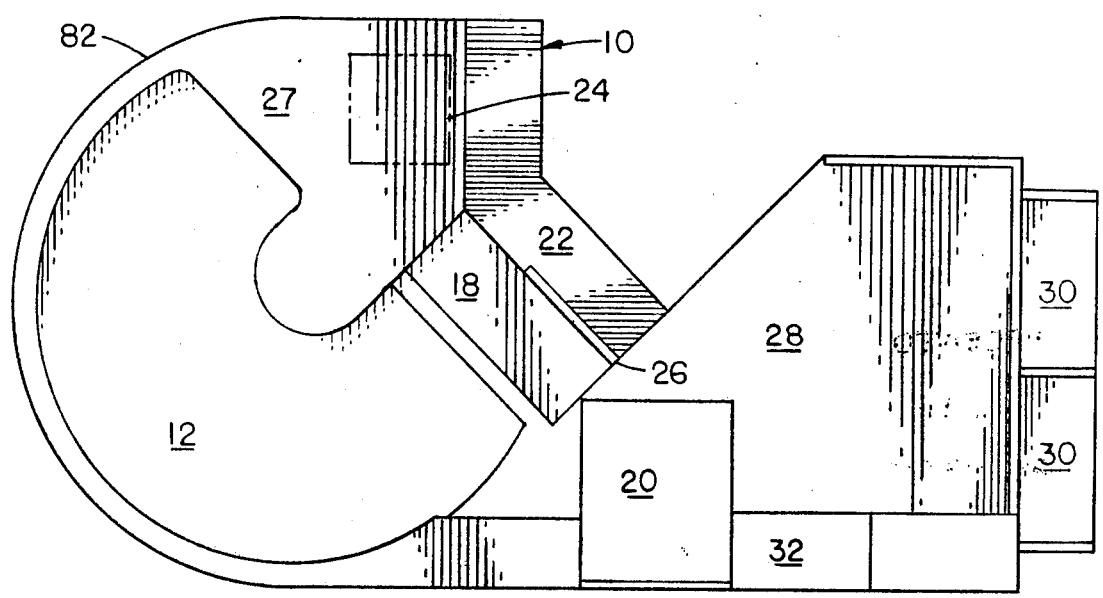
FIG. 2 is a top view of the market check out stand, indicating how the circular rotation product receiving and delivering belt end delivers the purchaser's goods directly to the checker and the scanner located just in front of the checker's position, also showing the convenient location of both the scale on the checker's left side and of the key-in entry of the register on the checker's right side, illustrating the bagging shelf used by the checker, and showing the additional collection and bagging area used when two persons are assisting the customers during peak rush periods, one person then pricing and the other bagging, or both bagging.
Figure 3:
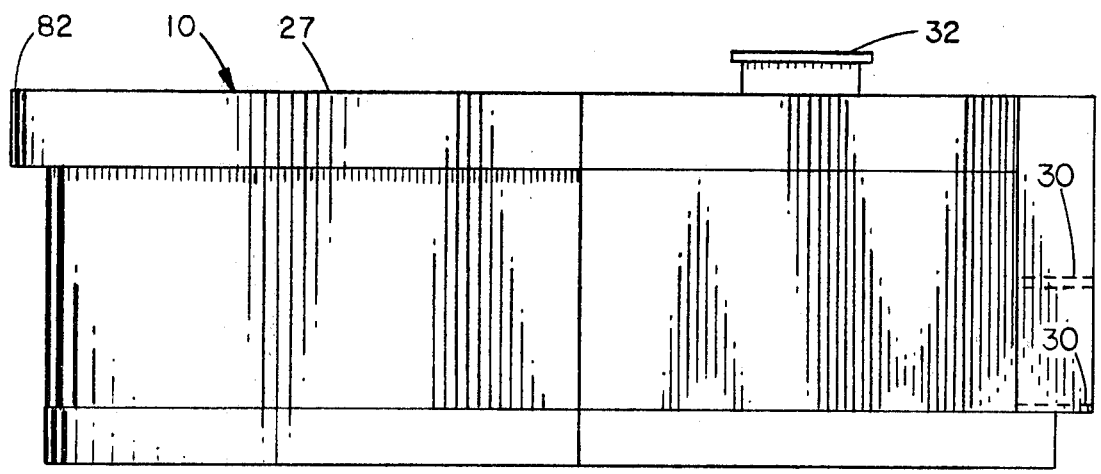
FIG. 3 is a right side view, also referred to as a view of the customer's side, of the market check out stand.
Figure 4:
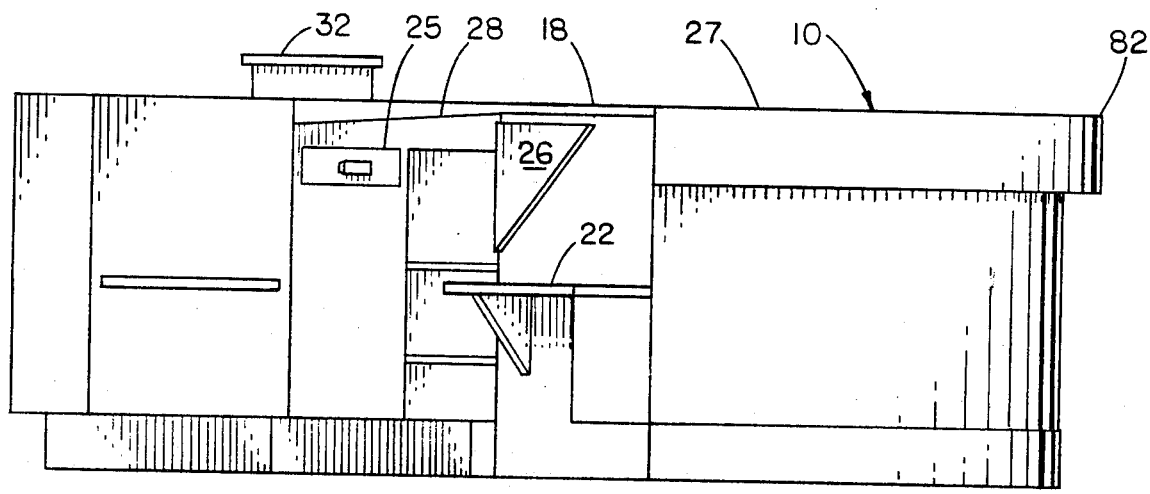
FIG. 4, is a left side view, also referred to as a view of the buggy or cart side, of a market check out stand.
Figure 5:
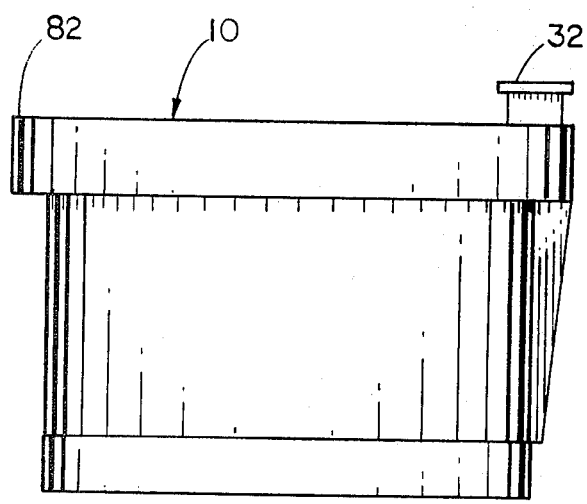
FIG. 5, is a front elevational view of the market check out stand.
Figure 6:
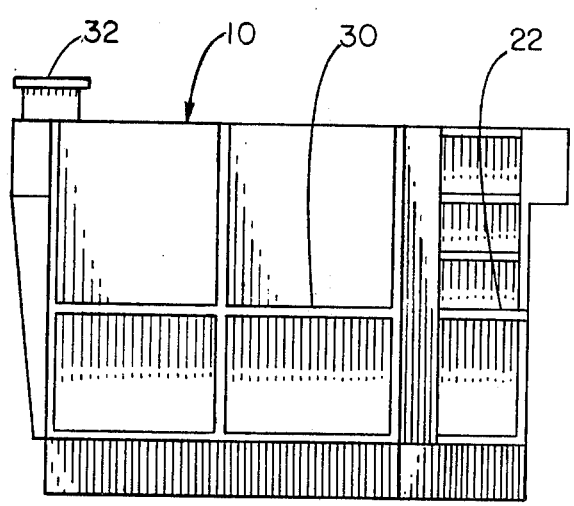
FIG. 6, is a rear elevational view of the market check out stand.

General Arrangement and Overall Operations of the Market Check Out Stand

In the drawings, in FIGS. 1 through 11, a preferred embodiment of the invention is shown, wherein a market check out stand 10 is equipped with a circular rotation product receiving and delivering belt, 12, which is partially folded under at all times, by using omni wheels 14, and driving wheels 16. In use, a customer's purchases in a buggy or cart are emptied on the exposed portions of this circular rotation product receiving and delivery belt 12, and upon selective rotation of this belt 12, the customer's purchases are end delivered to a checker. Generally using a product code scanner 18, over which he or she selectively passes the respective goods purchased by the customer, the checker then is automatically totalling the purchases. Also goods, such as some food products, not bearing a product code, are likewise end delivered, so the checker may quickly and conveniently move them to a scale 20 located on the checker's left side, in preparation for establishing their price, or manipulate them to find a current price tag or marking for entry via the key board cash register 24, located on checker's right side. The cash drawer 25, is preferably located to the right of the checker below the countertop 27.

Generally one checker is operating this market check out stand 10, and with the end delivery of the goods from this product receiving and delivering belt 12, she or he may conveniently and quickly bag the goods in bags placed directly in front of the checker on a shelf 22. Essentially without any digressing movements away from this location behind the scanner 18 and the bag shelf 22, the checker receives the end delivery of the purchases and quickly passes them over the scanner 18 or alternately weighs them at the conveniently located scale 20 and/or determines their individual price and enters the price in the conveniently located key board cash register 24. However, if necessary during rush periods, an assistant may come to help by bagging some or all of the customer's purchases. At this time, a fill in shelf 26 is pivoted up into position, and some or all of the purchaser's goods, after their price recording, are moved across the fill in shelf 26 to a rear accumulation counter area 28 for bagging at auxiliary bagging shelves 30. While the price recording and bagging is occurring, a customer may prepare to write his or her check on the check writing counter 32.

Utilizing the market check out stand 10 in either of these ways, being operated by one or two people, essentially the processing of customer's purchases is substantially speeded up. A major portion of both the speed and convenience realized, results from the end delivery of the goods by the circular rotation product receiving and delivering belt 12. When belt 12 is used in combination with other portions of this market check out stand 10, in comparison with other check out stands, it requires less floor space than other checking counters having either completely full horizontally surfaced rotating receiving belts or long linear moving receiving belts.

General Arrangement and Operation of the Circular Rotation Product Receiving and Delivering Belt As observed in FIGS. 1, 2, 7 and 8, the circular rotation product receiving and delivering belt 12, preferably made of three ply rubber belting, does not present, when viewed from above, a full circular surface, as a portion thereof is folded under. In order to provide the end delivery capability bringing the customers' goods straight toward the checker, a changing portion of this belt 12 during operations is being continuously moved over, down, and back, around omni wheels 14 mounted on a horizontal shaft 34. Each of these omni wheels 14, have three rollers 40 arranged around their periphery and rotatable about their respective axes 42 in a geometric plane of the omni wheel 14, which is perpendicular to the horizontal shaft 34 supporting the omni wheels 14, as shown in FIGS. 7, 8, 10 and 11.

Figure 7:
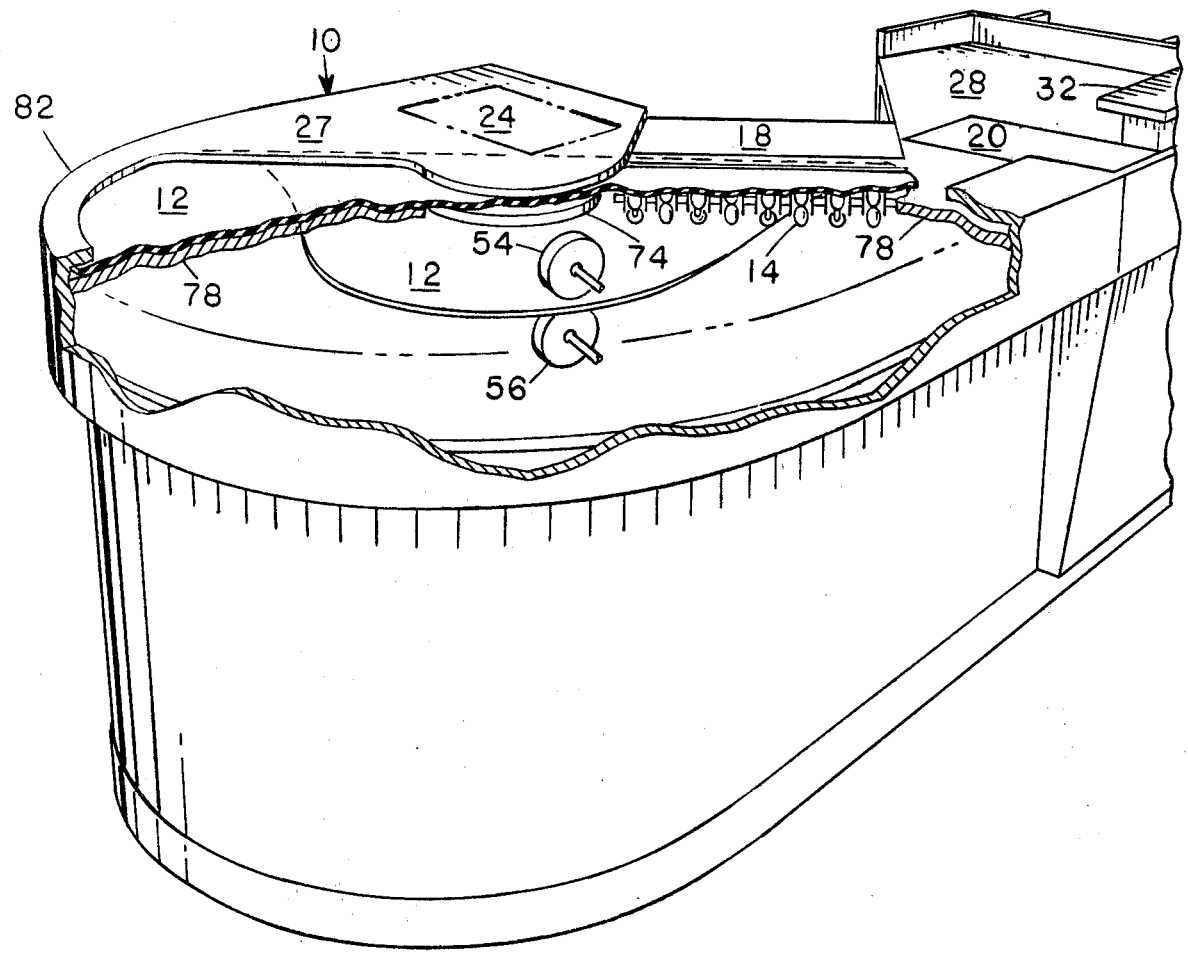
FIG. 7 is a partial front perspective view of the market check out stand with portions removed to illustrate how the circular rotation product receiving and delivering belt is folded under by using omni wheels and is then driven by tangentially positioned driving wheels.
Figure 8:
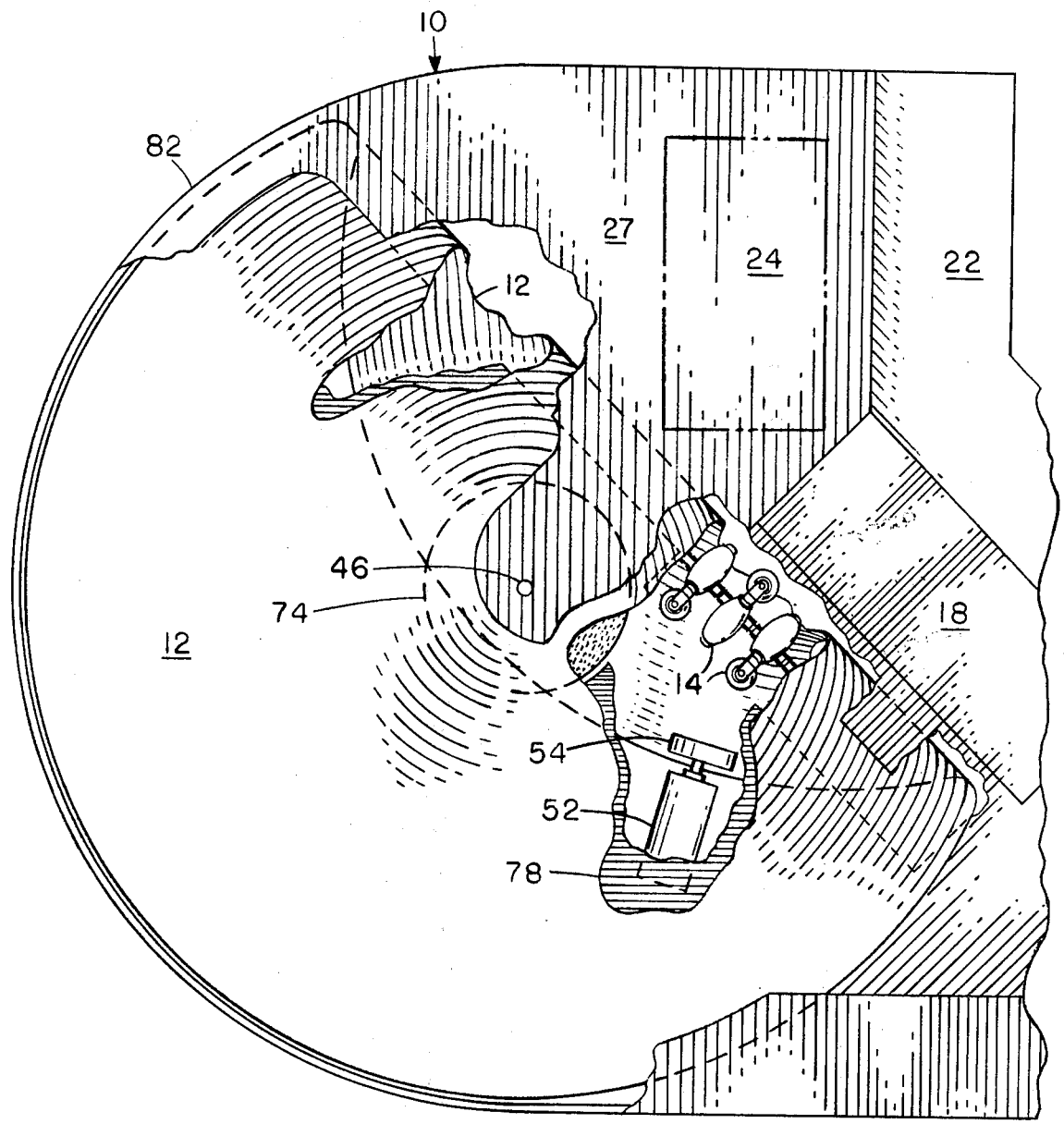
FIG. 8, is an enlarged partial top view with portions broken away to further illustrate how the circular rotation product receiving and delivering belt of this market check out stand is folded under by using omni wheels and is moved by using tangentially positioned driving wheels.
Figure 9:
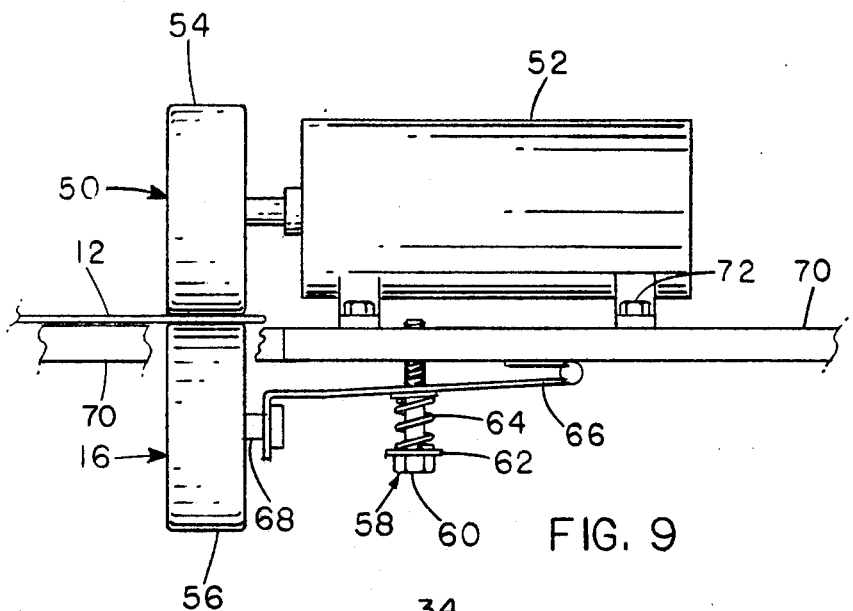
FIG. 9, is a partial vertical elevational view with portions removed, to illustrate the driving subassembly used to move the circular rotation product receiving and delivering belt.
Figure 10:
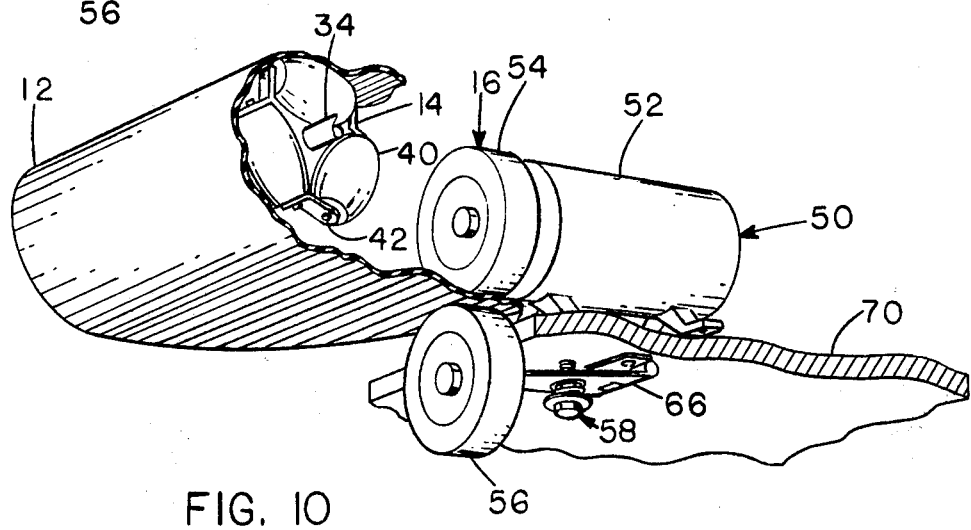
FIG. 10, is a partial perspective view looking from the left, buggy, or cart side, of the check out stand, of the driving subassembly, the omni wheels, and fold over portions of the circular rotation product receiving and delivering belt.
Figure 11:
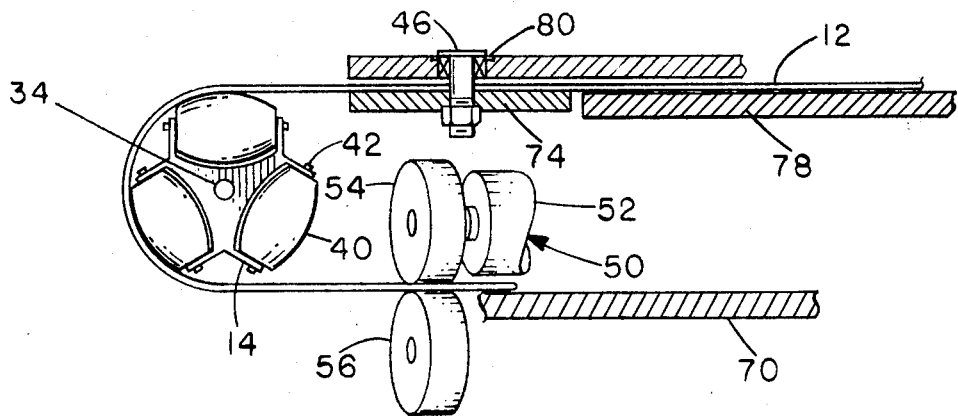

To keep the circular rotation product receiving and delivering belt 12 moving through this folding under operating configuration around the omni wheels 14, which are preferably located only on one side of the central vertical shaft 46, a driving subassembly 50 is used, as illustrated in FIGS. 9 and 10, and also shown partially in FIGS. 7, 8 and 11. Preferably, an electric motor 52 of this subassembly 50 drives a driven roller 54 and, directly below, is an idler roller 56 urged into contact with the belt 12 by a compression spring subassembly 58, to insure an excellent driving assembly 50. The compression spring subassembly 58, illustrated in FIGS. 9 and 10, comprises a bolt 60 and a washer 62, serving as a retainer for a compression spring 64, held captive about the bolt between the washer 62 and a pivotal actuating arm 66. This arm 66 is secured between the axle or shaft 68 of the idler roller 56 and a support member 70. This support member 70 positions both the electric motor 52 and its driven roller 54 using fasteners 72, and also positions the bolt 60. Moreover, support member 70 is initially adjustable before securement to the check out stand 10, to place the driving subassembly 50 in a tangential driving position at the outer extremities of the folded under belt portions of the circular rotation product receiving and delivering belt 12.

Further guiding control of this continuously folding under circular rotation product receiving and delivering belt 12 is provided by its lazy susan platform 74, mounted about the centered rotatable vertical shaft 46, and also by the sliding surfaced support 78 secured to the check out stand 10 and positioned below the larger exposed portion, which is constantly changing, of the circular rotation product receiving and delivering belt 12. Preferably portions of the rotating vertical shaft 46 rotate within bearing 80 to reduce the frictional load. The countertop 27 has a rim 82 which continues around over the edge of the revolving circular rotation product receiving and delivery belt. The circular lazy susan platform 74 is secured to the upper run of belt 12 at the central portion of the belt by any suitable means as best shown in FIG. 11.

I claim:
1. A conveyor assembly comprising a flexible disc shaped circular belt folded over under itself to form an upper product carrying run and a lower run, said upper run being substantially larger than said lower run and including the center of said circular belt, means confining said belt for rotation about a fixed vertical axis extending through said center, a stationary support under- lying a substantial portion of said upper run, means drivingly engageable with said belt for imparting rotation to said belt about said axis, and guide means engageable along the folded portion of said belt connecting said upper and lower runs to maintain said belt in predetermined folded configuration during rotation thereof, said means confining said belt for rotation about said axis comprising a part secured to the upper run of the belt at the central region of said belt extending about said center.

2. The conveyor assembly defined in claim 1 wherein said guide means is disposed only at one side of a plane containing said axis and extending at right angles with respect to said folded portion of the belt.

3. The conveyor assembly defined in claim 2 wherein said guide means comprises a set of omni rollers revolvable about a horizontal axis between said upper and lower runs.

4. The conveyor assembly defined in claim 2 wherein said guide means is disposed between said upper and lower runs and comprises a set of rollers and roller support means, said support means being mounted for rotation about a horizontal axis extending between said upper and lower runs, and said rollers being mounted on said support means for rotation about nonparallel axes which are spaced from said horizontal axis and which are contained in a common plane normally intersecting said horizontal axis.

5. The conveyor assembly defined in claim 2 wherein said guide means comprises a multidirectional roller assembly mounted between said upper and lower runs to engage the surface of said folded portion that faces toward said vertical axis.

6. The conveyor assembly defined in claim 1 wherein said guide means is disposed between said upper and lower runs and comprises a set of rollers and roller support means, said support means being mounted for rotation about a horizontal axis between said upper and lower runs, and said rollers being mounted on said support means for rotation about non-parallel axes which are non-intersecting with respect to said horizontal axis and which lie in a common plane normally intersecting said horizontal axis, said rollers being engageable with the surface of said folded portion that faces towards said vertical axis.

7. The conveyor assembly defined in claim 1 wherein said guide means comprises a set of omni rollers arranged between said upper and lower runs for engaging the surface of said folded portion that faces toward said vertical axis.

8. The conveyor assembly defined in claim 1 wherein said means imparting rotation to said belt comprises a rotatably-mounted, motor-driven member engaging the lower run of said belt.

9. The conveyor assembly defined in any one of the preceding claims 1–8 inclusive wherein said means drivingly engaging said belt is located at a position where it engages only the lower run of said belt.

10. The conveyor assembly defined in any one of the preceding claims 1–8 inclusive wherein said part is mounted on a shaft for rotation about said vertical axis.

11. The conveyor assembly defined in any one of the preceding claims 1–8 inclusive wherein said part is mounted on a shaft for rotation about said vertical axis and is disposed on the underside of said upper run to provide a support for said central region.

12. The conveyor assembly defined in any one of the preceding claims 2–5 inclusive wherein said means imparting rotation to said belt causes said upper run to revolve about said vertical axis in a pre-selected direction such that products carried on said upper run are discharged from the belt on the side of said plane where said guide means is located.

13. The conveyor assembly defined in claim 1 wherein said part is in the form of a plate mounted on a shaft for rotation about said vertical axis, said plate being positioned on the underside of said upper run to support said central region.

14. The conveyor assembly defined in claim 1 wherein said upper and lower runs are in parallel spaced apart relation.

* * * * *